United States Patent [19]
Fooladi

[11] 3,882,045
[45] May 6, 1975

[54] CATALYST COMPOSITION AND PRODUCTION OF 2,2-DICHLOROPROPIONIC ACID THEREWITH

[76] Inventor: Mike Mehdi Fooladi, Apt. 4-B, Oakmont Manor Apts., Vicksburg, Miss. 39180

[22] Filed: Feb. 28, 1974

[21] Appl. No.: 446,745

[52] U.S. Cl.......... 252/429 R; 252/437; 260/539 R
[51] Int. Cl. ........................ B01j 11/74; B01j 11/78
[58] Field of Search...... 252/429 R, 437; 260/539 R

[56] References Cited
UNITED STATES PATENTS 2,809,992   10/1957   Brust et al. ................... 252/437 X
3,671,584    6/1972   Schlecht et al. .............. 252/437 X Primary Examiner—Patrick P. Garvin
Attorney, Agent, or Firm—Zalkind, Horne & Shuffer

[57] ABSTRACT

A catalyst composition, particularly adapted for use in the production of dichloropropionic acid is provided. The catalyst composition comprises elemental iodine, which may be combined with a phosphorous trihalide or with bis (dimethyl thio carbamoyl) disulfide or with both. The catalyst composition makes possible the production of 2,2-dichloropropionic acid by direct chlorination of propionic acid, with substantially higher yields not heretofore obtainable in the production of 2,2-dichloropropionic acid by direct chlorination of propionic acid.

8 Claims, No Drawings

CATALYST COMPOSITION AND PRODUCTION OF 2,2-DICHLOROPROPIONIC ACID THEREWITH

This invention relates to a catalyst composition and to the use thereof for the production of 2,2-dichloropropionic acid.

It is known that chlorinated propionic acid, such as 2-monochloropropionic acid and 2,2-dichloropropionic acid have important uses, for example, as an intermediate in the manufacture of pesticides. As illustrated thereof, mention may be made of the sodium salt 2,2-dichloropropionic acid, which is widely used as a selective herbicide.

Various methods have heretofore been proposed for preparation of 2,2-dichloropropionic acid. However, the methods heretofore known or used are subject to a variety of difficulties or disadvantages. Among the latter, may be mentioned the fact that the prior art procedures are difficult to operate, the time required to form the chlorinated product is inordinately lengthy, they form unavoidable undesired polychlorinated products, the lower yield of the desired chlorinated propionic acid, they form an excessive amount of tar, and they form an excessive percentage of beta chlorination.

Thus, the patent to Bass, U.S. Pat. No. 2,010,685, discloses the method of chlorinating organic acids and acyl halides by reaction with chlorine in the presence of a carboxylic acid halide and a catalyst capable of forming an intermediate addition compound with the carboxylic acid halide, so that chlorination occurs in the aliphatic radical of the compound under treatment.

A later patent, U.S. Pat. No. 2,809,992 (Brust et al.) granted to the same assignee as that of the Bass patent, discloses procedure for halogenating an alpha-halopropionic acid to form a corresponding alpha, alpha-dihalo-propionic acid by chlorinating the alpha-halopropionic acid at elevated temperatures in the presence of a phosphorous-containing catalyst, such as phosphorous trichloride. The procedure disclosed by the aforesaid Brust et al. patent is carried out so that the resultant alpha, alpha-dihalo-propionic acid is in a form which is free or nearly free, of other poly-halo derivatives. Thus, the procedure disclosed by the Brust et al patent, utilizes alpha-halopropionic acid, such as alpha-chloropropionic acid for alpha-bromopropionic acid as the starting material, for halogenation with chlorine or bromine, to form the alpha, alpha-dihalo-propionic acid. In accordance with the Brust et al disclosure, the alpha-halopropionic acid employed as starting material may be prepared in accordance with the procedure described in the above-cited patent to Bass.

The more recent patent to Long, U.S. Pat. No. 3,452,089, discloses a process for the halogenation of lower aliphatic acids to produce the alpha, alpha-dihalo aliphatic acids by procedure which avoids certain of the disadvantages inherent in the process disclosed by Bass and by that disclosed in Brust et al. Among them are those arising from the difficulty of removing mono-halo derivatives from the desired di-halo derivatives, and from the tendency towards halogenation of the more remote carbon atom and other difficulties attending the procedures disclosed by Brust et al., as well as that disclosed by Bass.

The method disclosed in the Long et al. patent for the production of alpha, alpha-dihalo haliphatic acids comprises subjecting the acid to a halogenating action of chlorine or bromine in the presence of a sulfur-containing halogenation catalyst consisting of sulfur and the halides, oxyhalides, oxides, oxygen acids, and halo-oxygen acids of the element sulfur, the reaction being carried out in the presence of a specified amount of organic acid of a nitroaromatic compound wherein the nitro aromatic compound contains a benzene ring system to which one or more nitro groups are attached.

Although the method disclosed by Long for the production of alpha, alpha-dihalo aliphatic acids is stated to possess advantages over the methods described by both the Bass and by the Brust et al. patents, it does not provide the yields obtainable by the practice of the present invention, and fails to afford a number of the other advantages of the latter, as herein set forth.

A principal object of the invention is to provide an improved process for the production of 2,2-dichloropropionic acid by direct chlorination of propionic acid, which such method of chlorination will be such as to require a shorter reaction time, and yet will result in relatively high yields of the desired chloropropionic acid, and which will be free of the formation of polychlorination and of any substantial amount of tar, or of a substantial percentage of beta chlorination.

Another object of the invention is to provide a catalyst and catalyst compensation for the production of 2-monochloropropionic acid and 2,2-dichloropropionic acid.

It has been found that the objects of the invention are achieved by chlorination of propionic acid as hereinafter more specifically described, utilizing elemental iodine as a catalyst, or a catalyst composition composed of iodine combined with a phosphorous halide or with bis (dimethyl thio carbamoyl) disulfide or preferably with both a phosphorous halide, such as phosphorous trichloride, and bis (dimethyl thio carbamoyl) disulfide.

In the practice of the invention when utilizing elemental iodine as the single component catalyst, the concentration thereof may be in the range of 0.04 to 0.08% by weight based on the weight of the propionic acid to be chlorinated. When using the two-component catalyst the same may consist of 70–75% iodine and 20–25% of bis (dimethyl thio carbamoyl) disulfide; or it may consist of 2% iodine and 98% phosphorous trihalide, or 0.3 to 0.5% bis dimethyl thio carbamoyl) disulfide and 99 to 99.5% phosphorous trichloride.

The concentration of each individual catalyst in the three-component catalyst composition, or in the two-component catalyst composition, as well as the concentration of the elemental iodine in the case of the single component catalyst, is not very critical.

The invention is illustrated by the following Examples thereof:

EXAMPLE I

A charge of 555 parts of dry anhydrous propionic acid and 15 parts of phosphorous trichloride containing 2 parts of iodine is introduced into a jacketed glass reactor equipped with a condenser, a thermometer, an inlet gas distributing tube (sparger) for the introduction of chlorine, and an outlet tube for gases (hydrogen chloride and unreacted chlorine). The reactor was heated to 120°C±5°C. Chlorine was then fed through the gas distributing tube at a rate to prevent free chlorine escaping from the reflux column. After one hour of chlorination, the temperature of the reaction was increased to 130°C±5°C., and the following conditions were utilized while the reaction progress was maintained by gas chromotography throughout the chlorination:

a. the chlorination reaction was maintained at a temperature of 130°C.±5°C. for 6 hours, at the end of which time the specific gravity of the reaction mixture was 2.1129 at 25°C.;
b. the chlorination was maintained at 140°C. ± 5°C. until the specific gravity of the reaction mixture reached 1.2600 within 7 hours;
c. the chlorination was maintained at 150°C. ± 5°C. for 6 hours or until a specific gravity of the reaction mixture reached was 1.2870;
d. chlorination continued at 170°C.±5°C. until a specific gravity of 1.3059 was reached within 6 hours;
e. the temperature was brought to 190°C. ±5°C. until the specific gravity of 1.3150 was reached within 5 hours;
f. another 15 parts of phosphorous trichloride containing 2 parts of iodine, was added and the chlorination was maintained at 195°C. ± 5°C. until a specific gravity of 1.3270 was reached within 3 hours;
g. chlorination was continued at 200°C. ± 5°C. until the specific gravity of 1.4473 was reached within 27 hours.

At the end of a total of 61 hours reaction time, the content of the reactor was cooled down to 50°C., an the liquid was decanted from the solid residue of catalyst formed in the reaction vessel. Seven percent water was added to the decanted material, in order to convert all the acid chloride into 2,2dichloropropionic acid. The crude material was then stripped by bubbling nitrogen through the mixture to eliminate the dissolved HCl and trapped chlorine. The finished material weighed 900 parts (84%) containing 93% 2,2-dichloropropionic acid and 6% 2-mono chloro propionic acid. The yield was 85% based on total theoretical yield.

EXAMPLE II

Into a jacketed glass reactor equipped with the cold condenser (minus 10°C. to minus 20°C.), temperature indicator, outlet tube for gaseous hydrogen chloride and unreacted chlorine, and an inlet gas distributing tube for the introduction of chlorine, a charge of 1,462 parts of dry anhydrous propionic acid and 51 parts of phosphorous trichloride containing 3 parts of iodine, was placed. The reactor was heated to 120°C. ± 5°C. The chlorine was then fed through the sparger tube at a rate to prevent chlorine escaping from the reflux column.

The chlorination pattern was maintained similarly to that which prevailed during Example I, and the chlorination was discontinued when the specific gravity of the material reached 1.4437, which occurred with 66 hours.

At the end of the chlorination, the content of the reactor was cooled down to 50°C., and the liquid material was decanted. 5% water was added to convert all the acid chloride into 2,2dichloropropionic acid. Nitrogen was bubbled through the crude material to strip all the dissolved HCl and the unreacted chlorine. The finished product weighed 2725 (96.5%) parts containing 95% 2,2-dichloropropionic acid and 4.3% 2-monochloro propionic acid.

EXAMPLE III

Into a jacketed reactor equipped with a cold condenser (−30°C), temperature indicator, outlet tube for gaseous hydrogen chlorinde and unreacted chlorine, and an inlet gas distributing tube for the introduction of chlorine, a charge of 3,478 parts of dry anhydrous propionic acid was placed. The reactor was heated at 120°C ± 5°C. The chlorine was then fed through the sparger tube at a rate to prevent the free chlorine escaping from the reflux column. A total of 556 parts of catalyst containing 537 parts of $PCl_3$, 14 parts of iodine, and 5 parts of bis (dimethyl thio carbamoyl) disulfide was added continuously to the chlorination reactor. The progress of the reaction was monitored by gas chromatography. At the end of a total of 52 hours, the product contained 98% 2,2-dichloropropionic acid and 1.5% 2-monochloro propionic acid. At the end of this period the content of the reactor was cooled down to 50°C., the liquid material decanted, and 7% water was added to convert all the acid chloride into 2,2-dichloropropionic acid. Nitrogen was bubbled through the crude material to strip all of the dissolved HCl and the unreacted chlorine. The finished product weighed out 6,511 parts (97.06%) containing 98 % 2,2-dichloropropionic acid and 1.5% 2-monochloropropionic acid. The residue in the pot weighed out to be 310 parts (5.8%).

EXAMPLE IV

A glass vessel equipped with a reflux condenser, thermometer, and gas distributing tube for the introduction of chlorine was charged with 212 parts of commercial grade propionic acid, 4 parts of iodine, and 20 parts of $PCl_3$. Chlorine was fed through the tube at a rate slow enough to prevent free chlorine escaping from the reflux condenser. During the introduction of chlorine, the flask was heated to maintain the temperature in the flask between 120°–135°C. for 10 hours; then between 150°C.–160°C. for another 10 hours; then, between 180°–195°C. for another 8 hours. At the end of a total of 28 hours, the reaction was cooled down; then the liquid was decanted from the catalyst residue in the pot. The crude material was stripped by nitrogen. The crude material weighed 334 parts (87%) containing 81.77% 2,2-dichloropropionic acid, and 18.23% 2-monochloropropionic acid. The 87% yield does not include the quantities which were taken for sample analysis. It also does not include the proportion of material which was lost through the reflux column.

EXAMPLE V

A glass vessel equipped with a reflux condenser, thermometer, and gas distributing tube for introduction of chlorine was charged with 248 parts of dry propionic acid and 38 parts of catalyst containing 35 parts of $PCl_3$, 1 part of bis (dimethyl thio carbamoyl) disulfide, and 2 parts of iodine. Chlorine was fed through the tube at a rate slow enough to prevent free chlorine escaping from the reflux condenser. During the introduction of the chlorine, the flask was heated to maintain the temperature of the flask at 120°C.–135°C. for 4 hours; 140°C.–155°C. for 3 hours; 160°–175°C. for 6 hours; 180°C.–190°C. for 11 hours. After the chlorine had been introduced for a period of 24 hours, the reaction mixture was cooled; then it was decanted from the catalyst residue. The crude material after stripping weighed 375 parts, corresponding to a yield of 78.3% based on the theoretical yield which would have been produced by complete conversion of propionic acid into 2,2-dichloropropionic acid. The gas chromotography analysis of this material showed 95% 2,2-dichloropropionic acid, and 4% 2,2-monochloropropionic acid.

EXAMPLE VI

A glass vessel equipped, as in the other Examples, with the proper parts, was charged with 500 parts of dry propionic acid, 85 parts of propionic anhydride, and 0.24 parts of iodine. The chlorination conditions followed were to maintain the temperature in the flask at 120°C.–135°C. for ten hours, then increased in increments in successive periods of about 10 hours until a total of 64 hours of chlorination. At the end of the total of 64 hours of chlorination, the color of the product remained amber and also no residue was observed in the pot. 940 parts of product were found in the vessel, not including samples removed for analysis nor materials distilled out by the HCl off-gas stream. 10 parts of water was added to the product and then it was blown with nitrogen for one hour while the temperature was 40°–50°C. The analysis of the product revealed 91% 2,2-dichloropropionic acid, 7.5% 2-monochloro propionic acid, and 2% unknown materials.

EXAMPLE VII

Three vessels equipped with reflux condenser, thermometer, inlet tube and outlet tube were arranged in series. The arrangement of the series was employed to allow a much higher rate of chlorine, exceeding the normal rate, and also to determine the overall yield on the system. The first vessel was used as the prime chlorinator, the second vessel was used as a chlorine scavenger and also as a trap to absorb the distilled product with off-gases HCl from the prime chlorinator. The third vessel was employed to soak up all the chlorine and distilled product spilled from the prime chlorinator or the second vessel.

Each vessel was charged with 300 parts of dry propionic acid, 15 parts of PCl$_3$, and 0.17 parts of iodine. The chlorination pattern was carried out in the same manner as described in the prior Examples. At the end of 50 hours, the chlorination was stopped and the content of the three vessels was analysed. They showed the following:

| Vessel No. | %Propionic Acid | %2-monochloro propionic acid | %2,2-dichloro propionic acid |
|---|---|---|---|
| 1 | 0 | 2.48 | 94.61 |
| 2 | 3.00 | 69 | 28 |
| 3 | 64.0 | 35 | 2 |

Vessels number 2 and 3 were chlorinated, using a fresh batch of propionic acid as the third vessel in each case. After 20 hours the second vessel was finished and its material contained 95.3% 2,2-dichloropropionic acid, and 4,1% 2-monochloropropionic acid. The third vessel was finished after eleven hours of chlorination and contained 93.41% 2,2-dichloropropionic acid and 6.1% 2-monochloropropionic acid. The overall yield in the system was determined to be 92%.

EXAMPLE VIII

The Example VII was repeated, using 15 parts of PCl$_3$, 0.17 parts of iodine, and 0.06 parts of bis (dimethyl thio carbamoyl) disulfide. The prime chlorinator was stopped at the end of 40 hours. The contents of the vessels showed the following analysis:

| Vessel No. | %Propionic Acid | %2-monochloro propionic acid | %2,2-dichloro-propionic acid |
|---|---|---|---|
| 1 | None | 2.5 | 96.3 |
| 2 | 2.0 | 57.0 | 41 |
| 3 | 60.1 | 30.7 | 9.2 |

The second vessel was completed within 15 hours and the third vessel was finished within 7 hours. The overall yield of the system was determined to be 98.2% and the purity of 2,2-dichloropropionic acid in all three vessels ranged from 96.3% to 98.5%.

For the sake of more ready convenience in comparing the variations in respect of the ingredients and relative proportions thereof in the catalyst composition, as well as the variations in temperature and other operating conditions which may be utilized in the practice of the invention, as illustrated by the foregoing Examples, the data given therein is tabulated in Table I herebelow. In the tabulation (as in the above Examples) all amounts of ingredients stated are in parts by weight.

TABLE I

| EXAMPLE NO. | I | II | III | IV | V | VI | VII | VIII |
|---|---|---|---|---|---|---|---|---|
| Propionic acid | 555 | 1462 | 3478 | 212 | 248 | 585 | 300 | 300 |
| Catalyst: | | | | | | | | |
| PCl$_3$ | 30 | 51 | 537 | 20 | 35 | — | 15 | 15 |
| Iodine | 2 | 3 | 14 | 4 | 2 | 0.24 | 0.17 | 0.17 |
| DTCD* | — | — | 5 | — | 1 | — | — | 0.06 |
| Chlorination time (6hrs) | 61 | 66 | 52 | 28 | 24 | 64 | 81 | 62 |
| Yield: Percent (based on propionic used) | 84 | 96.5 | 97.06 | 87 | 78.3 | | 92 | 98.2 |

*bis (dimethyl thio carbamoyl) disulfide

As will be noted from the above data, Example VI, illustrates an embodiment of the invention wherein the chlorination was achieved with the use of iodine as single component catalyst, in an amount of less than one quarter of one part, relative to nearly 600 parts propionic starting material (500 parts of the dry acid and 85 parts of the propionic anhydride), the yield consisting of 91% 2,2-dichloroproponic acid and 7.5% 2-monochloropropionic acid, with a chlorination time of about 64 hours.

As indicated in the above data, when an embodiment wherein the two-component catalyst system composed of iodine and phosphorous trichloride is employed (Examples I, II, and IV,), yields of at least about 84% and as high as nearly 97%, of 2,2-dichloropropionic may be achieved, with chlorination times as low as 28 hours (see Example IV) and about 66 hours (see Example II).

In the embodiment of the invention wherein there is utilized the three-component catalyst composition containing bis (dimethyl thio carbamoyl) disulfide combined with a mixture of iodine and phosphorous trichloride (see Examples III, and V) yields of the order of 97–98% may be attained, with chlorination times of about 52 hours (in the case of Example III).

What is claimed is:

1. A catalyst composition consisting essentially of a mixture of elemental iodine and at least one compound selected from the group consisting of a phosphorus halide and bis (dimethyl thio carbamoyl) disulfide wherein the catalyst may consist of 70 to 75% iodine and 20 to 25% of bis (dimethyl thio carbamoyl) disulfide or it may consist of one part of iodine and either from about 5 to about 100 parts phosphorus halide or a mixture of from 0.20 to 0.8 parts bis (dimethyl thio carbamoyl) disulfide and from about 5 to about 100 parts phosphorus halide.

2. The catalyst composition of claim 1, wherein the selected compound is a phosphorous halide.

3. The catalyst composition of claim 2, wherein the selected compound is phosphorous trichloride.

4. The catalyst composition of claim 3, wherein bis (dimethyl thio carbamoyl) disulfide is combined with a mixture of iodine and phosphorous trichloride.

5. The catalyst composition of claim 3, wherein the ratio of phosphorous trichloride to iodine is about 90 to 1.

6. The catalyst composition of claim 5, containing bis (dimethyl thio carbamoyl) disulfide in an amount of about one part thereof to three parts iodine.

7. The catalyst composition of claim 3, wherein the ratio of phosphorous trichloride to iodine is in the range of from about 5 to 90 to each part of iodine.

8. The catalyst composition of claim 7, containing bis (dimethyl thio carbamoyl) disulfide in an amount of about one part thereof to about three parts of the iodine.

* * * * *